№ 3696
Thomas Bakewell: Improved Design for Trade Mark.
Reissued
Nov. 2, 1869.
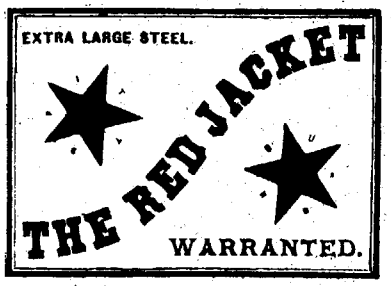
Witnesses:
George H. Christy
W. D. Lewis.
Inventor:
Thos Bakewell

UNITED STATES PATENT OFFICE.

THOMAS BAKEWELL, OF PITTSBURG, PENNSYLVANIA.

DESIGN FOR A TRADE-MARK.

Specification forming part of Design No. 2,792, dated October 1, 1867; Reissue No. 3,696, dated November 2, 1869.

*To all whom it may concern:*

Be it known that I, THOMAS BAKEWELL, of the city of Pittsburg, in the county of Allegheny and State of Pennsylvania, have originated and designed a new Design for a Trade-Mark, of which the following is a full, clear, and exact description, reference being had to the accompanying drawings, making a part of this specification.

My design for a trade-mark is described as follows: Two stars, arranged in or near the diagonally-opposite corners of a rectangular or square border, with the letters of the word "Pittsburg" arranged between the points of the stars, with the phrase "The Red Jacket" extending between the stars in a waving line from one to the other of the two remaining corners of the rectangle or square, and with the words "Extra Large Steel" above one star and the word "Warranted" under the other star.

What I claim as my invention, and desire to secure by Letters Patent, is—

The design for a trade-mark, consisting of two stars and the words "The Red Jacket" arranged substantially as herein set forth and shown.

In witness whereof I, the said THOMAS BAKEWELL, have hereunto set my hand.

THOS. BAKEWELL.

Witnesses:
WM. B. NEEPER,
THOS. B. KERR.